(12) United States Patent
Heinz

(10) Patent No.: US 6,663,140 B1
(45) Date of Patent: *Dec. 16, 2003

(54) SIDE IMPACT PROTECTION DEVICE FOR AN OCCUPANT OF A VEHICLE

(75) Inventor: Martin Heinz, Stuttgart (DE)

(73) Assignee: Dr. Ing. h.c.F. Porsche AG, Weissach (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 84 days.

(21) Appl. No.: 09/080,207

(22) Filed: May 18, 1998

(30) Foreign Application Priority Data

May 16, 1997 (DE) .......................... 197 20 584

(51) Int. Cl.[7] .............................. B60R 21/16
(52) U.S. Cl. .................. 280/730.2; 280/728.2
(58) Field of Search .................. 280/728.2, 730.2, 280/736, 728.1

(56) References Cited

U.S. PATENT DOCUMENTS

| | | | | |
|---|---|---|---|---|
| 5,062,664 A | | 11/1991 | Bishop et al. ............... 280/743 |
| 5,224,732 A | | 7/1993 | Warner et al. ............... 280/730 |
| 5,536,041 A | | 7/1996 | Acker et al. ................ 280/740 |
| 5,586,782 A | * | 12/1996 | Zimmerman, II et al. ........ 280/730.2 |
| 5,615,909 A | * | 4/1997 | Wipasuramonton et al. ...... 280/730.2 |
| 5,692,774 A | | 12/1997 | Acker et al. ................ 280/729 |
| 5,803,485 A | * | 9/1998 | Acker et al. ................ 280/730.2 |
| 5,848,804 A | * | 12/1998 | White, Jr. et al. ............ 280/730.2 |
| 5,853,191 A | * | 12/1998 | Lackat ...................... 280/730.2 |
| 5,868,421 A | * | 2/1999 | Eyrainer .................... 280/730.2 |
| 5,893,579 A | * | 4/1999 | Kimura et al. .............. 280/730.2 |
| 5,895,070 A | * | 4/1999 | Crimmins et al. ........... 280/729 X |
| 5,899,490 A | * | 5/1999 | Wipasuramonton et al. ..... 280/743.1 X |
| 5,911,434 A | * | 6/1999 | Townsend ................. 280/728.2 X |

FOREIGN PATENT DOCUMENTS

| | | |
|---|---|---|
| DE | 33 15 535 | 3/1984 |
| DE | 41 01 286 | 7/1992 |
| DE | 43 09 925 | 10/1993 |
| DE | 42 14 662 | 11/1993 |
| DE | 94 08 908.6 | 1/1995 |
| DE | 44 36 130 | 3/1995 |
| DE | 44 10 889 | 10/1995 |
| DE | 44 30 412 | 10/1995 |
| DE | 195 11 511 | 2/1996 |
| DE | 295 17 372 | 3/1996 |
| DE | 44 43 027 | 6/1996 |
| DE | 195 05 214 | 8/1996 |
| DE | 296 08 055 | 8/1996 |
| DE | 195 35 430 | 3/1997 |
| EP | 0 363 986 | 4/1990 |
| EP | 0 523 704 | 1/1993 |
| EP | 0 711 627 | 5/1996 |
| GB | 2 293 355 | 3/1996 |
| JP | 06 227348 | 8/1994 |

\* cited by examiner

*Primary Examiner*—F. Zeender
(74) *Attorney, Agent, or Firm*—Crowell & Moring LLP

(57) ABSTRACT

A side impact protection device for an occupant of a vehicle includes a housing fastened on the vehicle body side, a gas generator and an air bag. Within the air bag, a partition is provided which has a blocking effect for the gas flow emerging from the gas generator, and a main through-flow opening is formed on the partition. So that, in the inflated condition, the air bag takes up its ideal operating position, it is provided that, in its mounted position, the air bag is installed so that it is rotated with respect to the gas generator or to the housing, specifically in the opposite direction to the erection moment in effect in the air bag during the inflation thereof.

13 Claims, 4 Drawing Sheets

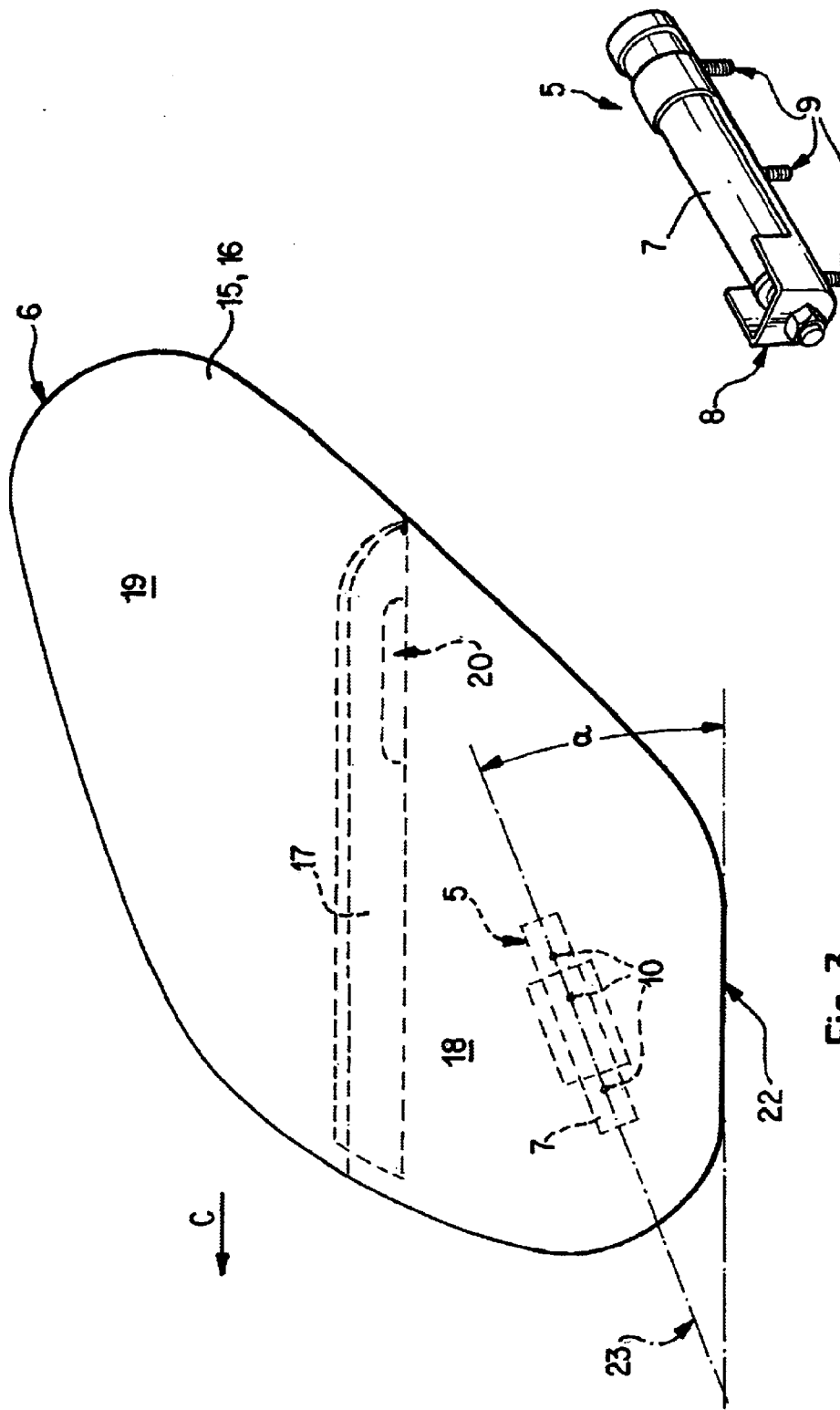

SIDE IMPACT PROTECTION DEVICE FOR AN OCCUPANT OF A VEHICLE

CROSS-REFERENCE TO RELATED APPLICATIONS

This application is related to application Ser. No. 09/079,389 filed on May 15, 1998 in the name of Martin Heinz et al. for SIDE IMPACT PROTECTION DEVICE FOR AN OCCUPANT; application Ser. No. 09/079,388 filed on May 15, 1998 in the name of Martin Heinz et al. for SIDE IMPACT PROTECTION DEVICE FOR AN OCCUPANT; application Ser. No. 09/080,248 filed on May 18, 1998 in the name of Martin Heinz et al. for SIDE IMPACT PROTECTION DEVICE FOR AN OCCUPANT; the subject matter of which is incorporated herein by reference.

BACKGROUND AND SUMMARY OF THE INVENTION

This application claims the priority of German application 197 20 584.4, filed in Germany on May 16, 1997, the disclosure of which is expressly incorporated by reference herein.

The invention relates to a side impact protection device for an occupant of a vehicle, comprising a housing fastened on the vehicle body side, a gas generator and an air bag, a partition with a blocking effect for the gas flow emerging from the gas generator being provided within the air bag and a main flow-through opening being constructed on the partition.

A side impact protection device of the type generally described above is known from German Patent Document DE 44 43 027 A1. Because of the distance between the vertical center-of-gravity axis of the gas generator and the housing to the vertical center axis of the main flow-through opening, during the inflation of the air bag, an erection moment for the air bag occurs below the partition which has the tendency to erect the air bag farther toward the front (i.e., rotate the air bag forward) than into the desired ideal operating position. This tendency is promoted by the fact that, at the time of the contact with the air bag, the occupant compresses this air bag.

It is an object of the invention to take such measures that an air bag provided with an interior partition and with a main flow-through opening provided in an offset position with respect to the gas generator on the partition takes up its ideal operating position in the inflated condition.

According to the invention, this and other objects have been achieved by providing a housing fastened on a body side of the vehicle; a gas generator; and an air bag including a partition with a blocking effect for gas flow emerging from the gas generator, said partition defining a main flow-through opening, the air bag being installed when viewed laterally in a mounted position rotated by an angle relative to the gas generator or to the housing in a direction opposite of an erection moment in effect in the air bag during inflation thereof.

According to the invention, this and other objects have been achieved by providing a housing; a gas generator mounted on the housing; and an air bag mounted on the housing and communicating with the gas generator, the air bag being rotated by an angle during inflation thereof by an erection moment, the air bag being mounted rotated by the negative of said angle.

According to the invention, this and other objects have been achieved by providing a method of mounting a side impact air bag in a vehicle, the air bag being rotated by an angle during inflation thereof by an erection moment, said method comprising mounting the air bag rotated by the negative of said angle.

The principal advantages achieved by the invention are that, as the result of the rotated installation of the air bag on the gas generator, the occurring moment during the inflation of the air bag is compensated and the inflated air bag is not displaced toward the front beyond its ideal operating position, whereby the operational safety of the side impact protection device is increased.

Other objects, advantages and novel features of the present invention will become apparent from the following detailed description of the invention when considered in conjunction with the accompanying drawings.

BRIEF DESCRIPTION OF THE DRAWINGS

FIG. 3 is an enlarged lateral view of the air bag and the tube generator in an unfolded position;

FIG. 4 is a perspective view of the gas generator with the generator support.

DETAILED DESCRIPTION OF THE DRAWINGS

Figure 1:
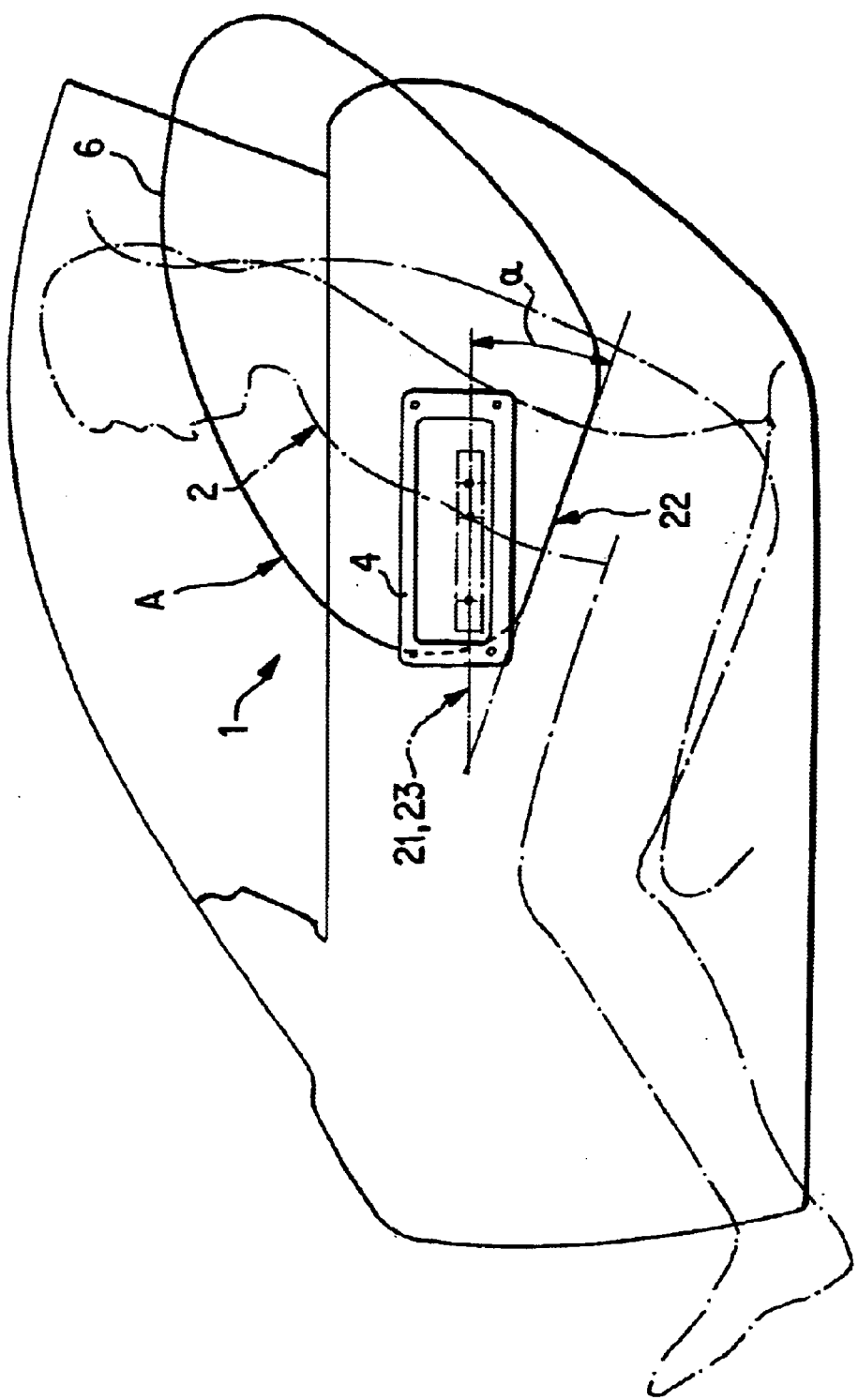
FIG. 1 is a partial lateral view of a side impact protection device for an occupant, in which case the air bag takes up a theoretical, unfolded installed position.

A lateral impact protection device 1 for an occupant 2 of a vehicle comprises a prefabricated installation module 3 which is composed of a housing 4, a gas generator 5 and an air bag 6. In the illustrated embodiment, the gas generator 5 is formed by an elongated tube generator 7 which is held in position on a generator support 8. On the side facing away from the tube generator 7, the generator support 8 has several spaced studs 9 for the fastening on the housing 4. The studs 9 of the generator support 8 arranged within the air bag 6, together with the tube generator 7, are guided through corresponding openings 10, 11 of the air bag 6 and of the housing 4. Nuts 12 are screwed from the outside onto the projecting end of the studs 9.

In the illustrated embodiment, the elongated housing 4 of the installation module 3, which is relatively flat viewed in the vertical direction, is inserted in sections into a rectangular cutout of an inside door panel 14 and is fastened on the inside door panel 14 by means of screws, rivets or the like.

The air bag 6, which consists of two fabric layers 15, 16 of approximately the same size which are arranged above one another and are sewed to one another along the peripheral edge, is divided into two adjoining chambers 18, 19 by means of a partition 17, in which case at least one main flow-through opening 20 between the two chambers 18, 19 is provided on the partition 17 away from the gas generator 5.

Figure 2:
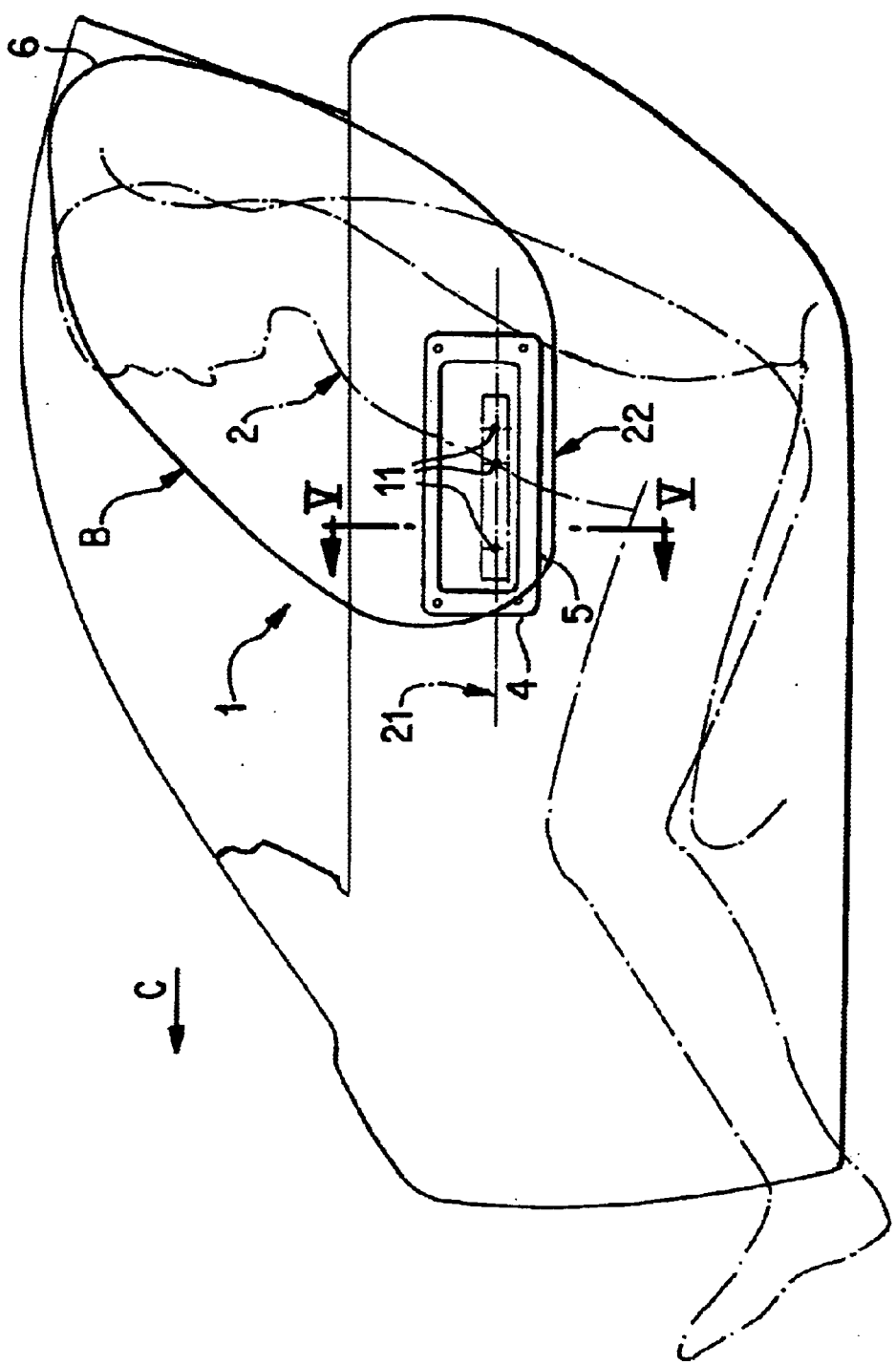
FIG. 2 is a partial lateral view corresponding to FIG. 1, in which the air bag takes up an ideal inflated operating position.
Figure 5:
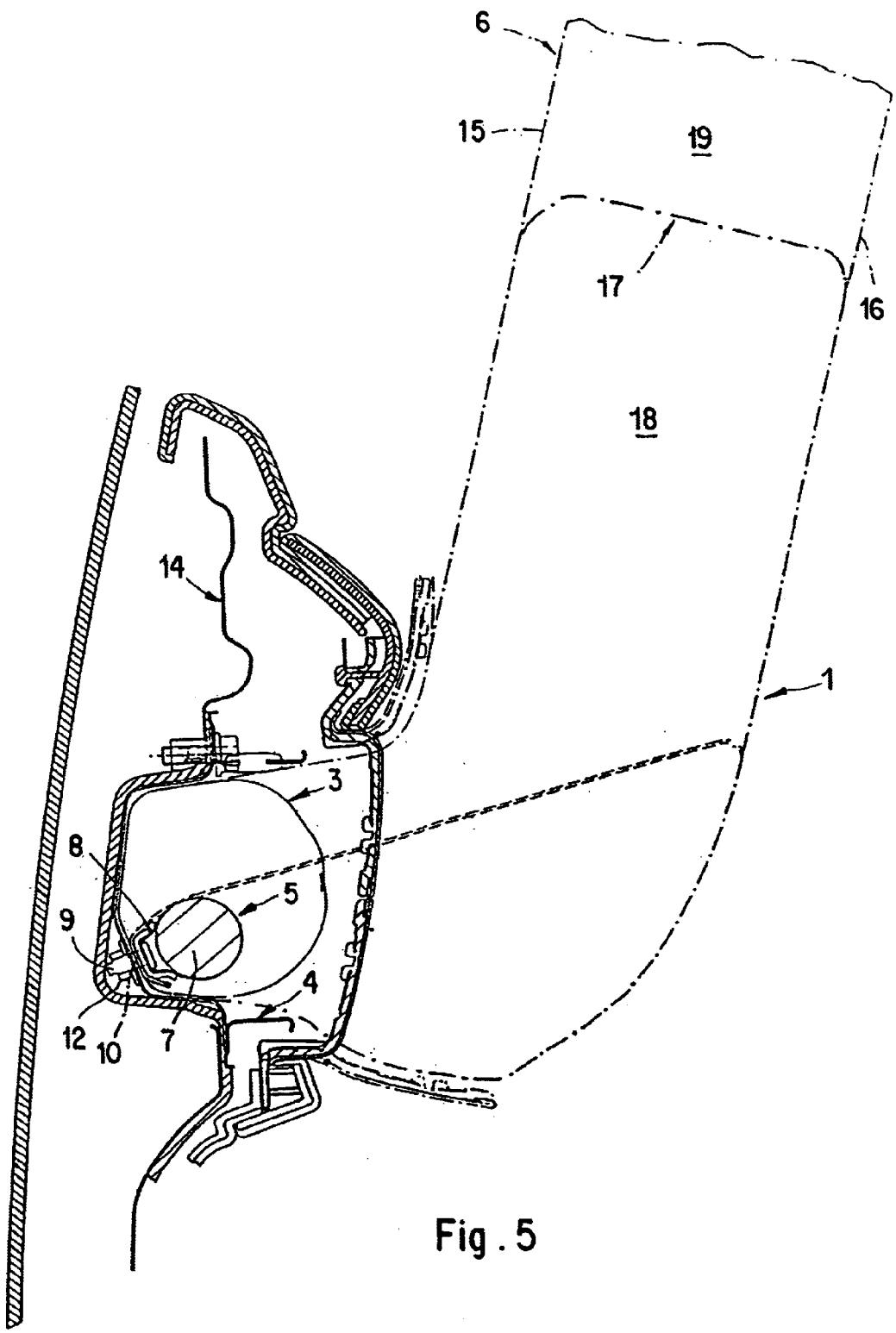
FIG. 5 is an enlarged sectional view according to Line V—V of FIG. 2.

The partition 17 used for directing the gas flow emerging from the gas generator 5 can also be formed by one or several catch bands. In the event of a side impact, in order to prevent the air bag 6 from moving toward the front beyond the "ideal operating position B", the air bag 6 is installed so that it is rotated with respect to the housing 4 or the gas generator 5, specifically against the erection moment in effect in the air bag during the inflating, by an angle α. In other words, the present invention compensates for the erection moment by mounting the air bag 6 rotated opposite the direction of the erection moment by the angle α, i.e., such that the air bag 6 would reach the static inflated position A shown in FIG. 1 if no erection moment were present. Accordingly, during inflation the air bag 6, the erection moment will rotate the air bag 6 forward by the angle a into the ideal protective position B shown in FIG. 2, advantageously protecting the occupant during the critical stages of a side impact.

In the illustrated embodiment, the three fastening points on the housing 4 for the generator support 8 carrying the gas generator 5 which are formed by the openings 11 are situated—in the lateral view—on an approximately horizontal auxiliary plane 21 extending in the longitudinal direction of the vehicle. The corresponding fastening points on the air bag 6 formed by the openings 10, in the delivery condition of the air bag 6 are not, as generally customary, aligned in parallel to a lower, approximately horizontally aligned boundary edge 22 of the air bag but are situated on a diagonally extending auxiliary plane 23 which extends at an angle α with respect to the lower boundary edge 22 of the air bag upwards toward the rear. The angle α is determined empirically and preferably amounts to approximately 20±10°.

During the assembly of the gas generator 5, the air bag 6 and the housing 4, by means of the congruent superposition of the two auxiliary planes 21, 23, the air bag 6 is installed so that it is rotated by the angle α so that, in the mounted position A, the lower boundary edge 22 of the air bag 6, viewed in the driving direction C, drops downward with its rearward end.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A side impact protection device for a passenger of a vehicle, comprising:

a housing, fastened in a side door of the vehicle, a gas generator held in the housing, an air bag which can be inflated by the gas generator, and a partition, providing a barrier effect for a gas flow emerging from the gas generator, provided within the air bag, said partition extending approximately parallel to a lower boundary edge of the airbag and including a main flow-through opening through which gas can flow, wherein the gas generator, connected with the air bag, extends along a longitudinal axis of the gas generator, and wherein the lower boundary edge of the air bag, in an unfolded mounted position, extends at an angle, which is not equal to zero, with respect to the longitudinal axis of the gas generator so that, during inflation, the air bag is rotatable, as a result of a torque generated by gas flow against the partition, through the angle in relation to the longitudinal axis into an inflated operating position providing ideal protection for the passenger, with the lower boundary edge of the air bag situated substantially parallel to said longitudinal axis of the gas generator.

2. The side impact protection device according to claim 1, wherein the angle is about 20°±10°.

3. The side impact protection device according to claim 1, wherein the lower boundary edge of the air bag, in the unfolded mounted position, drops off rearwardly at said angle.

4. A side impact protection device for a passenger of a vehicle, comprising:

a housing, fastened in a side door of the vehicle, a gas generator held in the housing, an air bag which can be inflated by the gas generator, and a partition, providing a barrier effect for a gas flow emerging from the gas generator, provided within the air bag, said partition including a main flow-through opening through which gas can flow, wherein the gas generator, connected with the air bag, extends along a longitudinal axis of the gas generator, and wherein a lower boundary edge of the air bag, in an unfolded mounted position, extends at an angle, which is not equal to zero, with respect to the longitudinal axis of the gas generator so that, during inflation, the air bag is rotatable through the angle in relation to the longitudinal axis into an inflated operating position providing ideal protection for the passenger.

5. The side impact protection device according to claim 4, wherein the air bag is rotated by said angle during inflation thereof by an erection moment.

6. The side impact protection device according to claim 5, wherein said erection moment is caused by gas flow emerging from the gas generator, said erection moment causing the air bag to rotate by said angle relative to said unfolded mounted position.

7. The side impact protection device according to claim 5, wherein said partition separates the air bag into two chambers which communicate by the main flow-through opening.

8. The side impact protection device according to claim 4, wherein the longitudinal axis of the gas generator extends in an approximately horizontal plane of the vehicle when in an installed position, and wherein said lower boundary edge of said air bag is inclined downwardly in a rearward direction with respect to the longitudinal axis.

9. The side impact protection device according to claim 4, wherein the angle is about 20°±10°.

10. The side impact protection device according to claim 9, wherein the longitudinal axis of the gas generator extends in an approximately horizontal plane of the vehicle when in an installed position, and wherein said lower boundary edge of said air bag is inclined downwardly in a rearward direction with respect to the longitudinal axis.

11. The side impact protection device according to claim 9, wherein said gas generator is an elongated tube generator with said longitudinal axis extending in an approximately horizontal plane when in an installed position in the side door, and wherein said lower boundary edge of said air bag is inclined downwardly in a rearward direction with respect to said longitudinal axis when said air bag is in said unfolded mounted position.

12. The side impact protection device according to claim 4, wherein the lower boundary edge of the air bag, in the unfolded mounted position, drops off rearwardly at said angle and, in the inflated operating position, extends approximately horizontally with respect to the longitudinal axis of the gas generator.

13. The side impact protection device according to claim 4, wherein said gas generator is an elongated tube generator with said longitudinal axis extending in an approximately horizontal plane when in an installed position in the side door, and wherein said lower boundary edge of said air bag is inclined downwardly in a rearward direction with respect to said longitudinal axis when said air bag is in said unfolded mounted position.

* * * * *